US009866293B1

(12) United States Patent
Da Silva et al.

(10) Patent No.: US 9,866,293 B1
(45) Date of Patent: Jan. 9, 2018

(54) APPARATUS, SYSTEM AND METHOD OF UPDATING ONE OR MORE BEAMFORMING SETTINGS OF A BEAMFORMED LINK

(71) Applicant: INTEL CORPORATION, Santa Clara, CA (US)

(72) Inventors: Claudio Da Silva, San Ramon, CA (US); Wook Bong Lee, Pleasanton, CA (US); Sarabjot Singh, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/199,422

(22) Filed: Jun. 30, 2016

(51) Int. Cl.
   *H04B 7/0456* (2017.01)
   *H04B 7/0417* (2017.01)
   *H04W 16/28* (2009.01)
   *H04L 12/26* (2006.01)

(52) U.S. Cl.
   CPC ......... *H04B 7/0456* (2013.01); *H04B 7/0417* (2013.01); *H04L 43/16* (2013.01); *H04W 16/28* (2013.01)

(58) Field of Classification Search
   CPC ..... H04B 7/0456; H04B 7/0417; H04L 43/16; H04W 16/28
   See application file for complete search history.

(56) References Cited

U.S. PATENT DOCUMENTS

| 6,441,784 B1* | 8/2002 | Fiore | H01Q 3/2611 342/377 |
| 6,483,459 B1* | 11/2002 | Hou | G01S 3/02 342/378 |
| 7,372,911 B1* | 5/2008 | Lindskog | H04B 7/0617 375/267 |
| 2013/0072247 A1* | 3/2013 | Park | H04B 7/0408 455/513 |
| 2016/0066197 A1* | 3/2016 | Park | H04W 16/28 370/329 |
| 2016/0118716 A1* | 4/2016 | Stephenne | H01Q 3/34 342/372 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Sophia Vlahos
(74) *Attorney, Agent, or Firm* — Shichrur & Co.

(57) ABSTRACT

Some demonstrative embodiments include apparatuses, devices, systems and methods of updating one or more beamforming settings of a beamformed link. For example, a first wireless station may be configured to estimate a change in an Angle of Arrival (AoA) of signals received from a second wireless station over a beamformed link between the first and second wireless stations; and to update one or more beamforming settings of the beamformed link based on the change in the AoA.

25 Claims, 9 Drawing Sheets

(56) References Cited

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Thomas Nitsche et al., "IEEE 802.11ad: Directional 60 GHz,Communication for Multi-Gigabit-per-Second Wi-Fi", IEEE Communications Magazine, Dec. 2014, pp. 132-141, 10 pages.
Xiaojing Huang et al., "A Hybrid Adaptive Antenna Array", IEEE Transactions on Wireless Communications, vol. 9, No. 5, May 2010, pp. 1770-1779, 10 pages.
Vasanthan Raghavan et al., "Beamforming Tradeoffs for Initial UE Discovery in Millimeter-Wave MIMO Systems", 2015 IEEE (Citation information: DOI 10.1109/JSTSP.2016.2523442,IEEE Journal of Selected Topics in Signal Processing), 17 pages.

\* cited by examiner

APPARATUS, SYSTEM AND METHOD OF UPDATING ONE OR MORE BEAMFORMING SETTINGS OF A BEAMFORMED LINK

TECHNICAL FIELD

Embodiments described herein generally relate to updating one or more beamforming settings of a beamformed link.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

A beamformed link between the BI and the BR may include a narrow beam between the BI and the BR.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
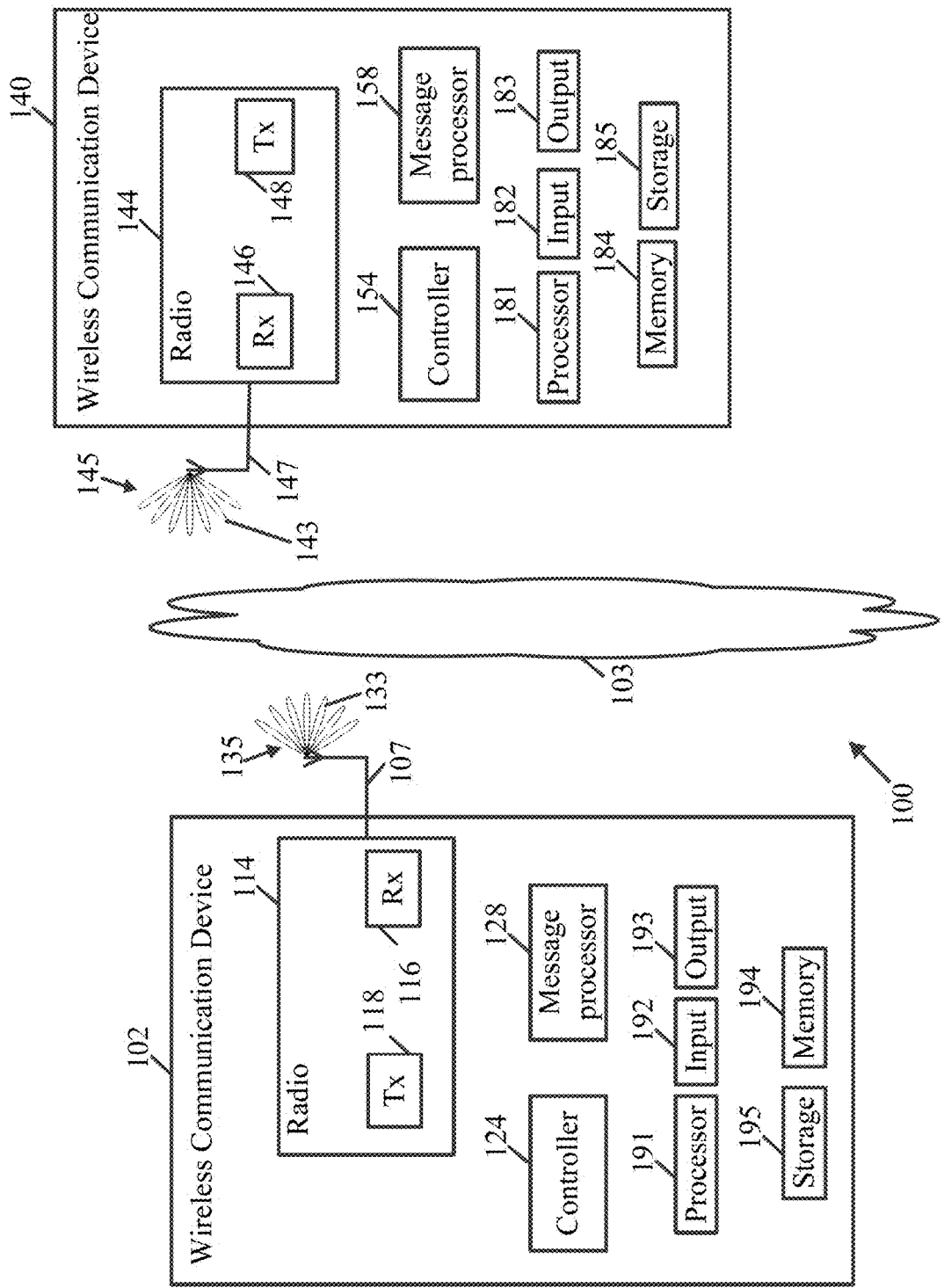
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012

(*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications, Mar.* 29, 2012); IEEE802.11ac-2013 (*"IEEE P802.11ac-2013, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment 4: Enhancements for Very High Throughput for Operation in Bands below 6 GHz", December,* 2013); IEEE 802.11ad (*"IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment 3: Enhancements for Very High Throughput in the 60 GHz Band",* 28 *Dec.,* 2012); IEEE-802.11REVmc (*"IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification"*); IEEE 802.11ax (*IEEE 802.11ax, High Efficiency WLAN (HEW)*); IEEE802.11-ay (*P802.11 ay Standard for Information Technology—Telecommunications and Information Exchange Between Systems Local and Metropolitan Area Networks—Specific Requirements Part* 11: *Wireless LAN Medium Access Control (MAC) and Physical Layer (PHY) Specifications—Amendment: Enhanced Throughput for Operation in License-Exempt Bands Above* 45 *GHz)*) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, *Aug.* 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include at least one DMG STA, and/or device 140 may include at least one DMG STA.

In some demonstrative embodiments, device 102 and/or device 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a wearable device, a server computer, a handheld computer, a handheld device, a sensor device, an Internet of Things (IoT) device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions. For example, antenna 107 may be steered to a plurality of beam directions 135, and/or antenna 147 may be steered to a plurality of beam directions 145. For example, device 102 may transmit a directional transmission to device 140, and/or device 140 may transmit a directional transmission to device 102.

In some demonstrative embodiments, device 102 and/or device 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link and/or any other link.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, communication over a DMG band, for example, a 60 GHz band may be directional.

In some demonstrative embodiments, a beamformed link between two stations (STAs), e.g., devices 102 and 140, may be established, for example, before data communication may take place between the two STAs.

In some demonstrative embodiments, device 102 and/or device 140 may select a pair of beams including a first beam direction of the plurality of beam directions 135, e.g., including a direction 133, and a second beam direction of the plurality of beam directions 145, e.g., including a direction 143, to communicate between devices 102 and 140 via a mmWave wireless communication link.

In some demonstrative embodiments, device 102 and/or device 140 may perform a beamforming (BF) procedure (also referred to as "beamforming training protocol" or "beamforming protocol"), for example, to select the pair of beams including beam directions 133 and 143.

In some demonstrative embodiments, system 100 may include a beamforming initiator (BI) and a beamforming responder (BR) to perform beamforming between the BI and the BR. For example, wireless communication device 102 may operate as and/or perform the role of the BI, and/or wireless communication device 140 may operate as and/or perform the role of the BR.

In other embodiments, wireless communication device 140 may operate as and/or perform the role of the BI, and/or wireless communication device 102 may operate as and/or perform the role of the BR.

In some demonstrative embodiments, the beamforming procedure may include a Sector level sweep (SLS) phase or protocol (also referred to as ads sector sweep (SSW) procedure), e.g., including, for example, an Initiator Sector Sweep (ISS), which may include a sector sweep performed, for example, by the Beamforming initiator, and a responder sector sweep (RSS), which may include a sector sweep performed, for example, by the Beamforming responder. The RSS may, for example, follow the ISS.

In some demonstrative embodiments, the beamforming procedure may include a Beam Refinement Protocol (BRP) phase, e.g., following the SLS phase In some demonstrative embodiments, device 102 and/or device 140 may opt to perform the BRP phase.

Some demonstrative embodiments are described herein with respect to a BRP, which may be performed after a SLS phase of a beamforming procedure. However, in other embodiments, BRP may be performed as part of any other additional or alternative phase and/or procedure.

In some demonstrative embodiments, device 102 and/or device 140 may exchange a plurality of BRP frames during the BRP phase. For example, device 102 may transmit one or more, e.g., a plurality of, BRP frames to device 140, and/or device 140 may transmit one or more, e.g., a plurality of, BRP frames to device 102.

In some demonstrative embodiments, the beamformed link may include a narrow beamformed link, e.g., using a narrow beam between devices 102 and 140, to communicate data.

In some demonstrative embodiments, millimeter-wave systems may perform the SSW procedure, for example, to enable the use of narrow beamforming.

In some demonstrative embodiments, during the SSW procedure the two stations may exchange transmissions over different antenna sectors, e.g., to determine a combination of sectors that provides a highest signal quality, for example, to determine the beam directions 133 and 143.

Figure 2:
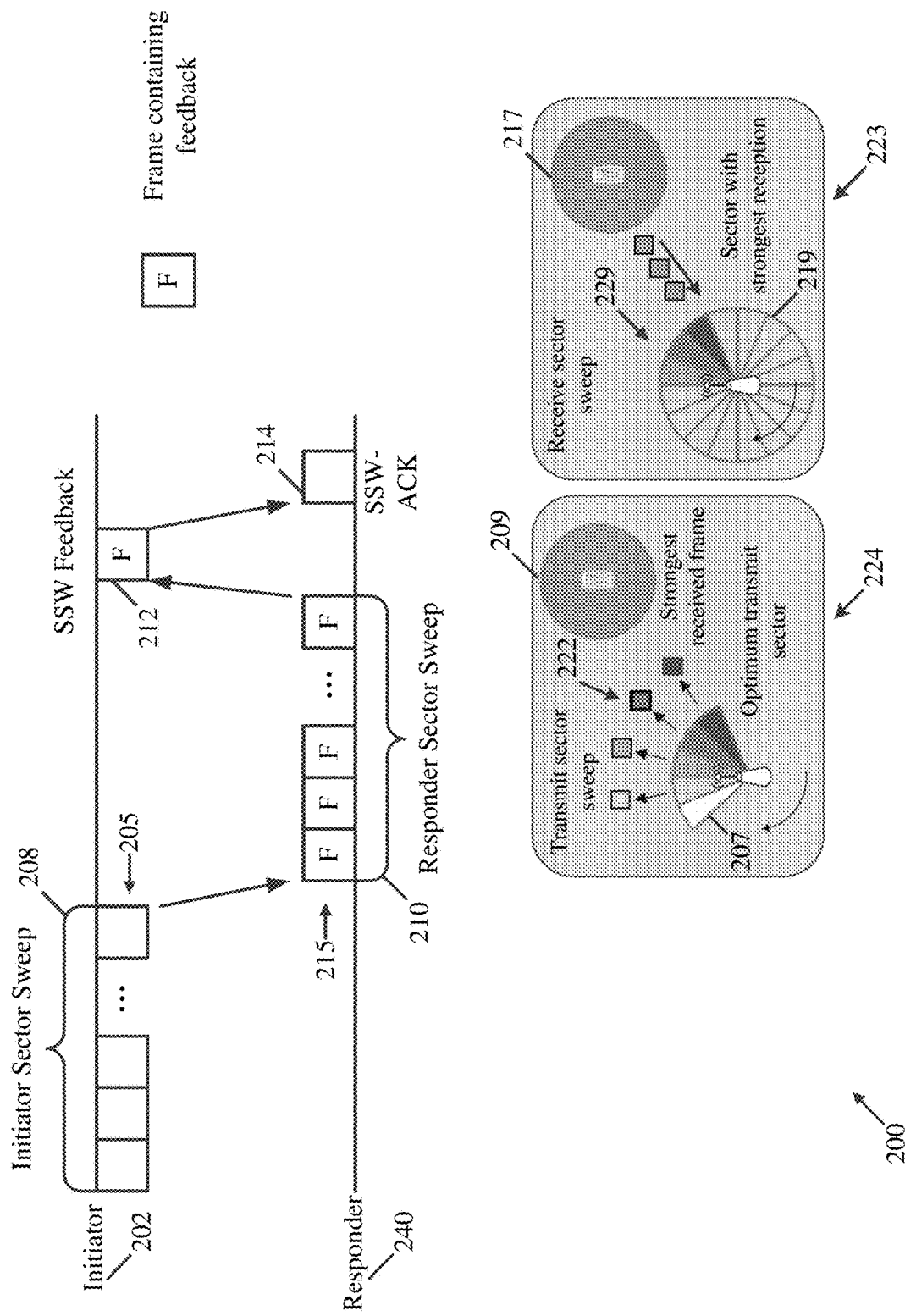
FIG. 2 is a schematic illustration of a Sector level Sweep (SLS) protocol, in accordance with some demonstrative embodiments.

Reference is made to FIG. 2, which schematically illustrates a Sector level Sweep (SLS) protocol 200, in accordance with some demonstrative embodiments.

In some demonstrative embodiments, as shown in FIG. 2, SLS protocol 200 may be performed between a BI 202 and a BR 240. For example, device 102 (FIG. 1) may operate as BI 202, and/or device 140 (FIG. 1) may operate as BR 240.

In some demonstrative embodiments, devices 102 and 140 (FIG. 1) may implement SLS protocol 200, for example, to discover sectors for communication between devices 102 and 140 (FIG. 1).

In some demonstrative embodiments, BI 202 and BR 240 may perform SLS protocol 200, for example, to select a transmit sector and/or a receive sector 224 for the BI 202, and/or to select a transmit sector and/or a receive sector for the BR 240.

As shown in FIG. 2, BI 202 and BR 204 may communicate a plurality of SSW frames during SLS protocol 200, for example, to discover coarse sectors for communication.

In some demonstrative embodiments, as shown in FIG. 2, during SLS protocol 200 each station, e.g., each of BI 202 and BR 240, may act once as a transmitter and once as a receiver.

In some demonstrative embodiments, SLS protocol 200 may include a Transmit sector sweep (TxSS) phase, which may include a TxSS 224, which may be performed by each of the BI 202 and the BR 240. For example, during the TxSS 224 a plurality of SSW frames may be transmitted from a transmitter device 207 on different sectors, while a receiver device 209 receives the SSW frames with a quasi-omnidirectional pattern, which may enable the receiver device 209 to determine and feed back to the transmitter device 207 an indication of an optimum transmit sector, e.g., a transmit sector 222.

In some demonstrative embodiments, SLS protocol 200 may include a Receive sector sweep (RxSS) phase, which may include an RxSS 223, which may be performed by each of the BI 202 and the BR 240. For example, during the TxSS 223, a plurality of SSW frames may be transmitted from a transmitter device 217, for example, via a best sector, e.g., the sector 222, while a receiver device 219 may switch between a plurality of receive sectors, to determine an optimum receive sector, e.g., a receive sector 229.

As shown in FIG. 2, the TxSS phase and/or the RxSS phase may include an Initiator Sector Sweep (ISS) 208, which may include a sector sweep performed, for example, by BI 202.

As shown in FIG. 2, BI 202 may transmit a plurality of SSW frames 205 during ISS 208, and the BR 240 may attempt to receive the SSW frame 205. For example, during the TxSS 224, the BI 202 may send the SSW frames 205 by sweeping through the transmit sectors of the BI 202, e.g., by performing a TxSS 224. For example, during the RxSS 223 the BI 202 may send the SSW frames 205 via the selected Tx sector of the BI 202, e.g., as determined during the TxSS 224. For example, during the TxSS 224, the BR 240 may receive SSW frames 205, for example, using a quasi-omnidirectional receive pattern. For example, during the RxSS 223, the BR 240 may receive SSW frames 205, for example, by sweeping through the receive sectors of BR 240, e.g., by performing the RxSS 223.

As shown in FIG. 2, BR 240 may transmit a plurality of SSW frames 215 during RSS 210, and the BI 202 may attempt to receive the SSW frame 215. For example, during the TxSS 224, the BR 240 may send the SSW frames 215 by sweeping through the transmit sectors of the BR 240, e.g., by performing TxSS 224. For example, during the RxSS 223 the BR 240 may send the SSW frames 215 via the selected Tx sector of the BR 240, e.g., as determined during the TxSS 223. For example, during the TxSS 224, the BI 202 may receive SSW frames 215, for example, using a quasi-omnidirectional receive pattern. For example, during the RxSS 223, the BI 202 may receive SSW frames 215, for example, by sweeping through the receive sectors of BI 202, e.g., by performing RxSS 223.

As shown in FIG. 2, the SSW frames 215 may include feedback from the BR 240 to the BI 202. For example, during the TxSS phase, SSW frames 215 may include an indication of the strongest transmit sector of BI 202 as may be determined by the BR 240.

As shown in FIG. 2, BI 202 may transmit an SSW Feedback frame 212 to BR 240, and BR 240 may transmit a Sector Sweep acknowledge (ACK) frame 214, e.g., to acknowledge receipt of Sector Sweep Feedback frame 212. For example, during the TxSS phase, the SSW feedback frame 212 may include an indication of a best transmit sector of BR 240, e.g., as may be determined buy the BI 202.

Referring back to FIG. 1, in some demonstrative embodiments, the SSW protocol 200 (FIG. 2), may be performed once, e.g., at a beginning of a beacon interval.

In some demonstrative embodiments, a sector, which may be selected during the he SSW procedure, may be refined in a BRP.

In some demonstrative embodiments, the BRP may be performed during a data transmission interval of the beacon interval, e.g., as described below.

In some demonstrative embodiments, the BRP may enable an optimization of antenna weight vectors, e.g., for phased array antennas.

Figure 3:
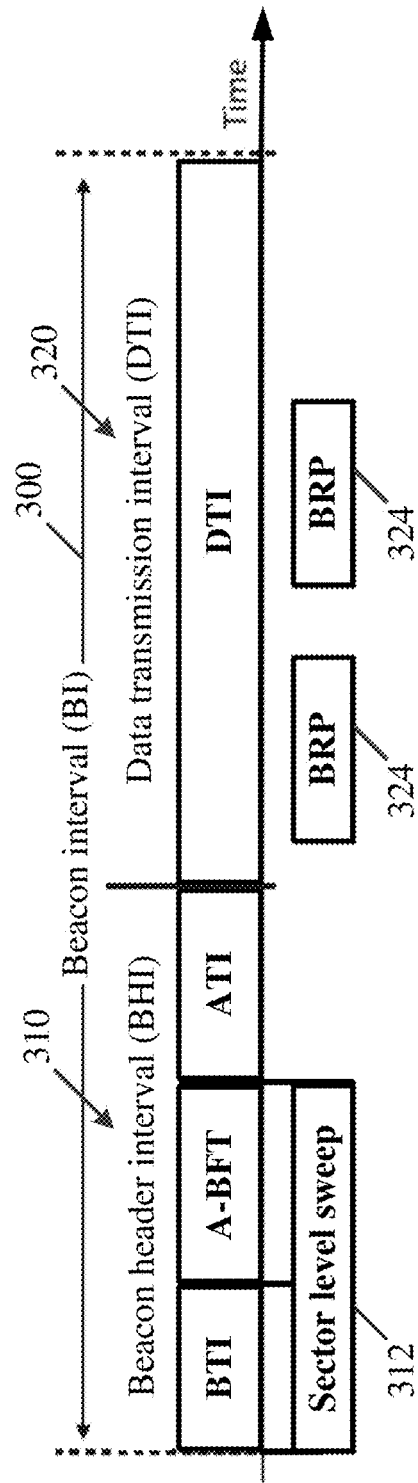
FIG. 3 is a schematic illustration of a structure of a beacon interval, in accordance with some demonstrative embodiments.

Reference is made to FIG. 3, which schematically illustrates a structure of a beacon interval 300, in accordance with some demonstrative embodiments.

As shown in FIG. 3, beacon interval 300 may include two portions, e.g., a beacon header interval (BHI) 310, and a data transmission interval (DTI) 320.

In some demonstrative embodiments, as shown in FIG. 3, an SLS protocol 312, e.g., SLS protocol 200 (FIG. 2) may be performed during BHI 310, for example, to discover coarse sectors for communication, e.g., as described above with referenced to FIG. 2.

In some demonstrative embodiments, as shown in FIG. 3, one or more BRP phases 324, may be performed during DTI 320, for example, once SLS protocol 312 is complete.

In some demonstrative embodiments, BRP phases 324 may be performed, for example, to fine-tune the coarse sectors, e.g., discovered during SLS protocol 312.

In one example, BRP phases 324 may be performed, for example, to achieve higher Signal to Noise Ratio (SNR) and/or to achieve any other goal.

In some demonstrative embodiments, during BRP phases 324, devices 102 and 140 (FIG. 1) may communicate a plurality of BRP frames, e.g., according to any suitable BRP algorithm, for example, to fine-tune the coarse sectors.

Referring back to FIG. 1, in some demonstrative embodiments, during the SSW protocol SLS protocol 312 (FIG. 3), and/or the BRP, e.g., BRP phases 324 (FIG. 3), stations may transmit and/or receive reference signals, for example, to update beamforming settings, e.g., antenna sectors and/or weight vectors, of a beamformed link and and/or to track channel variations, e.g., as a result of a movement of a user of one of the stations (also referred to as a "user mobility").

In some demonstrative embodiments, updating the beamforming settings of the beamformed link only during the SSW and/or the BRP procedures may significantly limit a capability of mmWave stations to adapt to changes in the environment, which may significantly reduce a quality of a beamformed link, e.g., in a timely manner.

In some demonstrative embodiments, the beamformed link between two stations (STAs), e.g., between devices 102 and 140, may be lost, for example, after performing the beamforming procedure.

In some demonstrative embodiments, a beamformed link may experience significant variations, e.g., variations that require changes to the beamforming settings, which may occur in a time interval, which is shorter than an interval time for performing the SSW and/or the BRP, for instance, as a result of user mobility.

In some demonstrative embodiments, due to the use of narrow beamforming, a beamformed link between two stations may be lost, for example, as a result of user mobility. For example, the beamformed link may be lost if an interval at which the SSW procedure and/or the BRP is performed is not short enough to track channel variations, e.g., due user mobility. Accordingly, a noticeable performance loss may occur, and the beamforming settings of the beamformed link may no longer be suitable.

Some demonstrative embodiments may enable devices 102 and/or 140 to update the beamforming settings of a beamformed link and/or to determine if an update to the beamforming settings of the beamformed link is needed, for example, independent of and/or not during the beamforming procedure, e.g., the BRP phase and/or the SSW protocol.

Some demonstrative embodiments may provide a mechanism ("the beamforming update mechanism"), which may enable first and second mmWave stations to determine a need for updating one or more beamforming settings of a beamformed link between the first and second stations, for example, based on a received frame, e.g., every received frame, for example, by estimating an Angle of Arrival (AoA) of the received frame, e.g. as described below.

In some demonstrative embodiments, the AoA may include an azimuth AoA and/or an elevation AoA, and/or any other directionality parameter of the AoA.

In some demonstrative embodiments, the beamforming update mechanism may enable the first and/or second stations to identify the need for updating the one or more beamforming settings of the beamformed link, for example, during reception of reference signals, control frames and/or data frames. Accordingly, the beamforming update mechanism may enable identifying changes in the beamformed link more quickly, e.g., as described below.

In some demonstrative embodiments, if the need for updating the one or more beamforming settings of the beamformed link is identified, e.g., based on the change in the AoA, a station of the first and second stations, that detects the change in the AoA, may adapt transmission settings and/or reception settings, e.g., even immediately, for example, by using a beam broadening mechanism, e.g., as described below.

In some demonstrative embodiments, the beamforming update mechanism may enable to increase a probability of correct detection, e.g., despite a beam "mismatch", for example, by relying on beam broadening, for example, if a need for updating the one or more beamforming settings is identified, e.g., as described below.

In some demonstrative embodiments, the beamforming update mechanism may implement a feedback mechanism, to allow the first station to signal back an identified need to update the one or more beamforming settings to the second station, e.g., as described below.

In some demonstrative embodiments, if the need for updating the one or more beamforming settings of the beamformed link is identified by a station, e.g., based on the change in the AoA, the station may be configured to feedback the identified change in the AoA to the peer station, and/or to request the peer station to perform a sector sweep and/or a beam refinement procedure, e.g., as described below.

In some demonstrative embodiments, the station may be configured to request the peer station to use a broader beam, for example, based on an estimated variation of the AoA, e.g., as described below.

In some demonstrative embodiments, the beamforming update mechanism may enable stations, e.g., mmWave stations using the narrow beamforming, to be more robust to channel variations, which may be caused, for example, by user mobility and/or other factors, for example, a dynamic blockage, e.g., as described below.

In some demonstrative embodiments, wireless stations employing a hybrid beamforming scheme, e.g., an antenna array with digital process chains, may be configured to accurately estimate the angle of arrival of incoming signals.

In other embodiments, other wireless stations, e.g., employing a fully digital beamforming scheme, may be configured to accurately estimate the angle of arrival of incoming signals.

In other embodiments, any other wireless stations, e.g., employing any other beamforming scheme, may be configured to estimate the angle of arrival of incoming signals.

In some demonstrative embodiments, devices 102 and/or 140 may process communication over a beamformed link, for example, according to a hybrid beamforming scheme.

In some demonstrative embodiments, devices 102 and/or 140 may be configured to estimate an AoA of incoming signals, for example, by exploiting a correlation of signals in the digital process chains, e.g., as described below.

Figure 4:
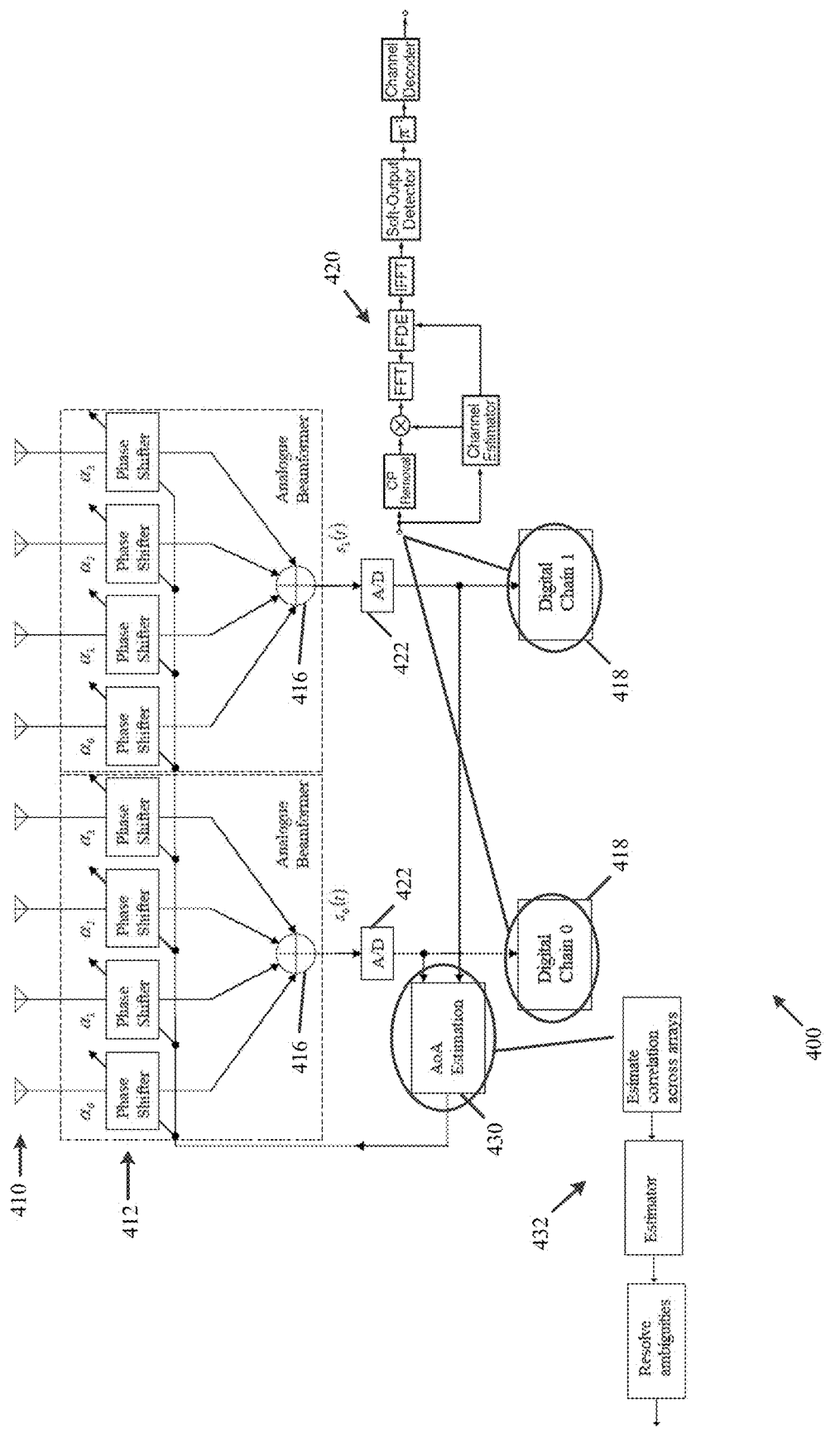
FIG. 4 is a schematic illustration of an antenna array, in accordance with some demonstrative embodiments.

Reference is made to FIG. 4, which schematically illustrates an antenna array 400, in accordance with some demonstrative embodiments.

In one example, devices 102 and/or 140 (FIG. 1) may include antenna array 400.

In some demonstrative embodiments, antenna array 400 may be configured to employ a hybrid beamforming scheme.

In some demonstrative embodiments, as shown in FIG. 4, antenna array 400 may include a plurality of antenna elements 410, which may be connected to a plurality of respective phase shifters 412.

In some demonstrative embodiments, as shown in FIG. 4, antenna array 400 may include two analog beamformers 416, for example, to form two respective beams.

In some demonstrative embodiments, as shown in FIG. 4, the two analog beamformers 416 may be connected to two respective digital chains 418, for example, via two respective Analog to Digital (A/D) converters 422.

In some demonstrative embodiments, as shown in FIG. 4, each digital chain 418 may a plurality of digital processing elements 420.

In some demonstrative embodiments, antenna array 400 may be configured to enable estimation of an AoA of incoming signals.

In some demonstrative embodiments, as shown in FIG. 4, antenna array 400 may include an AoA estimator 430 configured to estimate the AoA of the incoming signals.

In some demonstrative embodiments, as shown in FIG. 4, AoA estimator 430 may include one or more modules 432, e.g., a module to estimate correlation across arrays, an estimator module, and/or a resolve ambiguities module.

Referring back to FIG. 1, in some demonstrative embodiments, devices 102 and/or 140 may be configured to estimate the AoA of incoming signals, for example, in a non-data aided manner, e.g., during a reception of reference, control, and/or data signals, for example, even without knowledge of the channel, and/or independently of other receive chain operations, e.g., such as channel estimation and/or channel decoding.

In some demonstrative embodiments, devices 102 and/or 140 may implement an AoA estimator, e.g., AoA estimator 430 (FIG. 4) and/or any other AoA estimator, e.g., as described below.

In some demonstrative embodiments, devices 102 and/or 140 may estimate the AoA using one or more concepts of Array theory, e.g., as described below. In other embodiments, devices 102 and/or 140 may estimate the AoA using any other method, algorithm and/or procedure.

In some demonstrative embodiments, a signal, denoted $s_m(t)$, at an output of an $m^{th}$ sub-array of a hybrid array system e.g., the hybrid antenna array of FIG. 4, may be defined, e.g., as follows:

$$s_m(t) = \qquad (1)$$
$$x(t)e^{j2\pi f_D t}\sum_{i=0}^{N-1} P_{i,m}(\theta,\varphi)e^{j\left[\frac{2\pi}{\lambda_C}(X_{i,m}\sin\theta\cos\varphi + Y_{i,m}\sin\theta\sin\varphi) + \alpha_{i,m}\right]} + n_m(t)$$

wherein $x(t)$ denotes an incident signal, $f_D$ denotes a Doppler frequency shift, $P_{i,m}(\omega,\varphi)$ denotes a radiation pattern of an antenna located at $(X_{i,m}, Y_{i,m})$ $\theta$ and $\varphi$ denote zenith and azimuth angles, respectively, and $\alpha_{i,m}$ denotes a shift given by the i-th phase shifter of the m-th sub-array.

In some demonstrative embodiments, assuming that the radiation pattern and a phase shift value of the $i^{th}$ antenna of all sub-arrays are the same, a correlation, denoted Rx, of a signal at the output of a first reference sub-array, denoted $S_0(t)$), and a second reference sub-array, denoted $S_s(t)$), which is on the side of the first reference sub-array, when the first and second sub-arrays have the same y coordinate, and the first and second sub-arrays are spaced by $\Delta x$ on the x-axis, may be determined, e.g., as follows:

$$R_x = E[s_0(t)s_s^*(t)] = E[|x(t)|^2]|P_s(\theta, \varphi)|^2 e^{j\frac{2\pi}{\lambda_C}\Delta_x \sin\theta \cos\varphi} \quad (2)$$

wherein $P_S(\theta,\varphi)$ denotes a sub-array radiation pattern, which may be the same for all sub-arrays, e.g., due to the assumptions described above.

In some demonstrative embodiments, a correlation, denoted Ry, of a signal at the output of a reference sub-array and a sub-array that share the same x coordinate, which may be spaced by $\Delta y$ on the y-axis, may be determined, e.g., as follows:

$$R_y = E[s_0(t)s_A^*(t)] = E[|x(t)|^2]|P_s(\theta, \varphi)|^2 e^{j\frac{2\pi}{\lambda_C}\Delta_y \sin\theta \sin\varphi} \quad (3)$$

In some demonstrative embodiments, the arguments of Equations 2 and 3 are given as $$\frac{2\pi}{\lambda_C}\Delta_x \sin\theta\cos\varphi \text{ and } \frac{2\pi}{\lambda_C}\Delta_y \sin\theta\sin\varphi,$$

respectively.

In some demonstrative embodiments, these arguments may include AoA information of the incident signal. Accordingly, the angles $\theta$ and/or $\varphi$ may be determined, for example, directly from the two estimated correlation values Rx and Ry.

In some demonstrative embodiments, according to the discussion above with respect to Equations 1-3, the AoA information may be estimated, for example, even without any prior information of the incident signal. For example, the AoA of an incident signal may be estimated, for example, during reception of reference, control and/or data signals, for example, even without knowledge of a channel over which the signals are received, and/or independently of one or more other receiver operations, and/or in mmWave systems utilizing hybrid antenna arrays.

In some demonstrative embodiments, devices 102 and/or 140 may be configured to estimate the AoA of received signals, for example, based on Equations 1-3, e.g., as described above. In other embodiments, devices 102 and/or 140 may be configured to estimate the AoA of received signals, for example, based on any other calculations, methods, parameters, and/or function.

In some demonstrative embodiment, device 140 may be configured to transmit signals to device 102, and device 102 may be configured to estimate the AoA of the signals from device 140, e.g., as described below.

In some demonstrative embodiments, controller 154 may be configured to control, cause and/or trigger device 140 and/or transmitter 148 to transmit signals over a beamformed link between device 102 and device 140.

In some demonstrative embodiments, device 102 may receive the signals from device 140.

In some demonstrative embodiments, controller 124 may be configured to control, cause and/or trigger device 102 and/or receiver 116 to estimate a change in an AoA of the signals received from device 140 over the beamformed link between devices 102 and 140.

In some demonstrative embodiments, controller 124 may be configured to control, cause and/or trigger device 102 to update one or more beamforming settings of the beamformed link, for example, based on the change in the AoA.

In some demonstrative embodiments, the one or more beamforming settings may include one or more receive beamforming settings to receive the signals, e.g., as described below.

In some demonstrative embodiments, the receive beamforming settings may include a receive beamwidth of a receive beam to receive the signals, a receive sector to receive the signals, one or more weight vectors to form the receive beam, and/or one or more additional or alternative settings.

In some demonstrative embodiments, the one or more beamforming settings may include one or more transmit beamforming settings to transmit over the beamformed link, e.g., as described below.

In some demonstrative embodiments, the transmit beamforming settings may include a transmit beamwidth of a transmit beam, a transmit sector to transmit the transmissions, one or more weight vectors to form the transmit beam, and/or one or more additional or alternative settings.

In some demonstrative embodiments, controller 124 may be configured to control, cause and/or trigger device 102 to update the one or more beamforming setting, for example, based on a comparison between the change in the AoA and a predefined threshold.

In one example, controller 124 may be configured to control, cause and/or trigger device 102 to update the one or more beamforming settings, for example, only if the change in the AoA is greater than the predefined threshold, e.g., if the change in the AoA is wider than a predefined degree.

In some demonstrative embodiments, controller 124 may be configured to control, cause and/or trigger device 102 to increase the receive beamwidth of the receive beam of the beamformed link, for example, based on the change in the AoA.

In one example, controller 124 may be configured to control, cause and/or trigger device 102 to increase the receive beamwidth of the receive beam of the beamformed link by a first receive broadening factor for a first change in the AOA; and/or controller 124 may be configured to control, cause and/or trigger device 102 to increase the receive beamwidth of the receive beam of the beamformed link by a second receive broadening factor, which is greater than the first broadening factor, for a second change in the AOA, which is, for example, greater than the first change in the AoA.

In some demonstrative embodiments, controller 124 may be configured to control, cause and/or trigger device 102 to increase the transmit beamwidth of the transmit beam of the beamformed link, for example, based on the change in the AoA.

In one example, controller 124 may be configured to control, cause and/or trigger device 102 to increase the transmit beamwidth of the transmit beam of the beamformed link by a first transmit broadening factor, e.g., responsive to a first change in the AOA; and/or controller 124 may be configured to control, cause and/or trigger device 102 to increase the receive beamwidth of the receive beam of the beamformed link by a second transmit broadening factor, e.g., which is greater than the first broadening factor, for example, responsive to a second change in the AOA, e.g., which is greater than the first change in the AoA.

In some demonstrative embodiments, controller 124 may be configured to control, cause and/or trigger device 102 to initiate a SSW procedure or a BRP with device 140, for example, based on the change in the AoA.

In some demonstrative embodiments, device 102 may signal to device 140 an indication of the change in the AoA, and or device 102 may request device 140 to perform one or more operations, for example, based on the change in the AoA, e.g., as described below.

In some demonstrative embodiments, controller 124 may be configured to control, cause and/or trigger device 102 and/or transmitter 118 to transmit to device 140 a feedback frame including an indication of the change in the AoA.

In some demonstrative embodiments, controller 124 may be configured to control, cause and/or trigger device 102 and/or transmitter 118 to transmit the feedback frame, which may be configured, for example, to request device 140 to perform the SSW procedure or the BRP with device 102.

In some demonstrative embodiments, controller 124 may be configured to control, cause and/or trigger device 102 and/or transmitter 118 to transmit the feedback frame, which may be configured, for example, to indicate the receive broadening factor of the increase in the receive beamwidth implemented by device 102, and/or to indicate the transmit broadening factor of the increase of the transmit beamwidth implemented by device 102.

In some demonstrative embodiments, controller 124 may be configured to control, cause and/or trigger device 102 and/or transmitter 118 to transmit the feedback frame, which may be configured, for example, to request device 140 to increase a transmit beamwidth of a transmit beam of device 140.

In some demonstrative embodiments, device 140 may receive the feedback frame including the one or more indications and/or requests from device 102, e.g., as described above.

In some demonstrative embodiments, controller 154 may be configured to control, cause and/or trigger device 140 and/or receiver 146 to process the feedback frame including the indication of the change in the AoA of the signals received at device 102.

In some demonstrative embodiments, controller 154 may be configured to control, cause and/or trigger device 140 to update one or more beamforming settings of the beamformed link at device 140, for example, based on the change in the AoA, which is indicated in the feedback frame from device 102.

In some demonstrative embodiments, controller 154 may be configured to control, cause and/or trigger device 140 to increase a transmit beamwidth of a transmit beam of device 140 to transmit over the beamformed link, for example, based on the change in the AoA, which is indicated in the feedback frame from device 102.

In some demonstrative embodiments, controller 154 may be configured to control, cause and/or trigger device 140 to increase the transmit beamwidth of the transmit beam of device 140, for example, if the feedback frame includes a request from device 102 to device 140 to increase the transmit beamwidth of the transmit beam of device 140.

In some demonstrative embodiments, controller 154 may be configured to control, cause and/or trigger device 140 to cause device 140 to increase a receive beamwidth of a receive beam of device 140 of the beamformed link, for example, based on the change in the AoA, which is indicated in the feedback frame from device 102.

In some demonstrative embodiments, controller 154 may be configured to control, cause and/or trigger device 140 to initiate a SSW procedure or a BRP with device 102, for example, based on the change in the AoA, which is indicated in the feedback frame from device 102.

In some demonstrative embodiments, controller 154 may be configured to control, cause and/or trigger device 140 to initiate the SSW procedure or the BRP with device 102, for example, if feedback frame includes a request from device 102 to device 140 to perform the SSW procedure or the BRP with device 102.

Some demonstrative embodiments are described herein with respect to mmWave stations using hybrid antenna arrays. However, other embodiments may be implemented with respect to any other type of antenna array, e.g., a fully digital array implementation, and/or with respect to any wireless system, for example, a cellular systems, e.g., 5G cellular systems.

Figure 5:
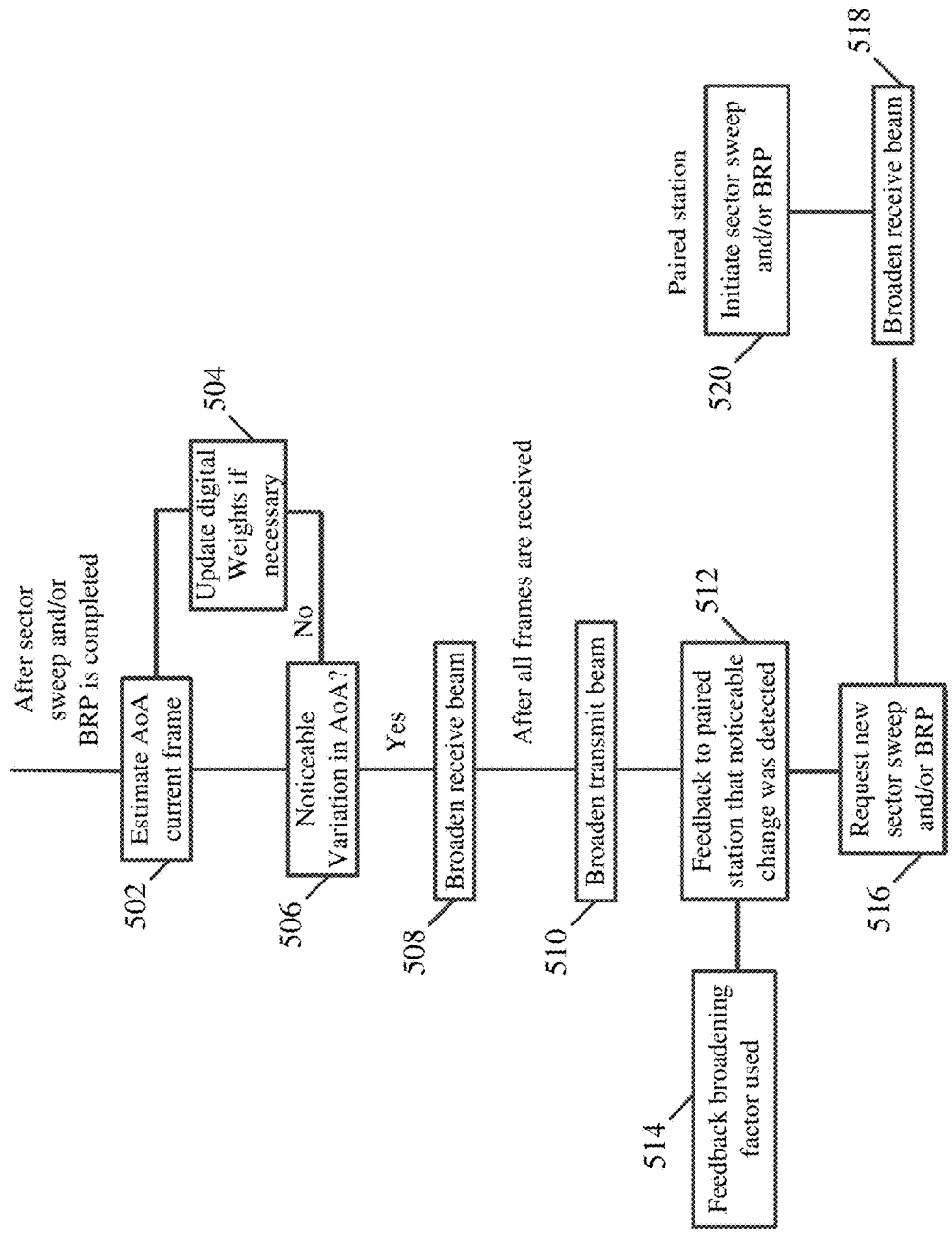
FIG. 5 is a schematic flow-chart illustration of a method of updating one or more beamforming settings of a beamformed link, in accordance with some demonstrative embodiments.

Reference is made to FIG. 5, which schematically illustrates a method of updating one or more beamforming settings of a beamformed link, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include estimating an AOA of a frame. For example, device 102 (FIG. 1) may estimate an AoA of one or more signals received by device 102 (FIG. 1), e.g., as described above.

In some demonstrative embodiments, after devices 102 and 140 (FIG. 1) determine their best transmit and receive sectors, e.g., as part of a sector sweep procedure, e.g., SSW 200 (FIG. 2), each device of devices 102 and 140 (FIG. 1) may estimate the AoA of signals received by the device, for example, even independently of content of the received signals, e.g., data or control frames.

As indicated at block 504, the method may include updating digital weights, e.g., if necessary. For example, device 102 (FIG. 1) may update the beamforming settings of the beamformed link between devices 102 and 140 (FIG. 1), e.g., as described above.

In some demonstrative embodiments, if a variation in the estimated AoA values obtained in consecutive frames is small, e.g., $\Delta_\theta^2 + \Delta_\varphi^2 < \gamma$, device 102 (FIG. 1) may not perform any correction in the beamforming settings, or only a minor correction may be performed, e.g., a combining of weights in the digital domain may be updated.

As indicated at block 506, the method may include detecting a noticeable variation in the AOA. For example, device 102 (FIG. 1) may determine if the change in the AoA is greater than a predefined threshold, e.g., as described above.

In some demonstrative embodiments, for example, if the variation in the estimated AoA values obtained in consecutive frames is larger than the threshold, device 102 (FIG. 1) may initiate a procedure to adapt to the changes in the AoA, e.g., as descried below.

As indicated at block 508, the method may include broadening a beamwidth of a receive beam. For example, device 102 (FIG. 1) may increase the receive beamwidth of the receive beam utilized by device 102 (FIG. 1) for the beamformed link with device 140 (FIG. 1), e.g., as described above.

In one example, the width of the received beam may be broadened, for example, to increase a probability of correctly decoding one or more subsequent frames, e.g., since that antenna sectors and/or weight vectors found in a previous sector sweep and/or BRP procedure may not necessarily remain optimal.

As indicated at block 510, the method may include broadening a beamwidth of a transmit beam. For example, device 102 (FIG. 1) may increase the transmit beamwidth of the transmit beam utilized by device 102 (FIG. 1) for the beamformed link with device 140 (FIG. 1), e.g., as described above.

In one example, the width of the transmit beam may be broadened, for example, since when the receive antenna sectors and/or weight vectors found in a previous sector sweep and/or BRP procedure may no longer be optimal, it is possible that also the transmit sectors and weight vectors may no longer be optimal.

In some demonstrative embodiments, broadening factors of the transmit and/or receive beams may be pre-defined by a particular implementation and/or a particular standard, and/or may be adaptive. For example, different broadening factor may be applied, for example, depending on a relative angular change, which may be measured during the AoA estimation. In one example, larger broadening factors may be used, e.g., if a detected angular variation is larger.

As indicated at block 512, the method may include sending a feedback frame indicating the change in the AoA. For example, device 102 (FIG. 1) may send to device 140 (FIG. 1) a feedback frame indicating the change in the AOA, e.g., as described above.

In one example, after having identified a change in the beamformed link, e.g., the change in the AoA, device 102 (FIG. 1) may report information corresponding to the change in the AoA to device 140 (FIG. 1), e.g., in a first transmission after detecting the change in the AoA or in a later transmission, e.g., as described below.

In some demonstrative embodiments, the method may include reporting to the peer device an indication that a change in the AoA has been identified. For example, device 102 (FIG. 1) may report to device 140 (FIG. 1) that a change in the AoA has been identified, e.g., a change that requires updating to the antenna sector and weight vectors of the beamformed link.

As indicated at block 514, the method may include indicating to the peer device the beam broadening factors for reception and/or transmission and/or the angular variation. For example, device 102 (FIG. 1) may send to device 140 (FIG. 1) a feedback frame indicating the transmit and/or receive broadening factors implemented by device 102 (FIG. 1), e.g., as described above.

As indicated at block 516, the method may include initiating or requesting a sector sweep procedure or a BRP procedure to be performed. For example, device 102 (FIG. 1) may initiate the SSW and/or the BRP procedure with device 140 (FIG. 1), and/or device 102 (FIG. 1) may send to device 140 (FIG. 1) a feedback frame to request device 140 to perform the SSW and/or the BRP procedures with device 102 (FIG. 1), e.g., as described above.

In some demonstrative embodiments, the method may include performing one or more operations based on the received feedback frame. For example, upon a reception of the feedback frame that indicates that a change in the AoA was identified, device 140 (FIG. 1) may perform one or more operations, e.g., as described below.

As indicated at block 518, the method may include broadening a beamwidth of a receive beam or a transmit beam at the receiver of the feedback frame. For example, device 140 (FIG. 1) may increase the receive beamwidth of the receive beam and/or the transmit beam of device 140 (FIG. 1), e.g., as described above.

As indicated at block 520, the method may include initiating or requesting a sector sweep procedure or a BRP procedure to be performed. For example, device 140 (FIG. 1) may initiate the SSW and/or the BRP procedures with device 102 (FIG. 1), and/or device 140 (FIG. 1) may request that device 102 perform the SSW and/or the BRP procedures with device 140 (FIG. 1), e.g., as described above.

Figure 6C:
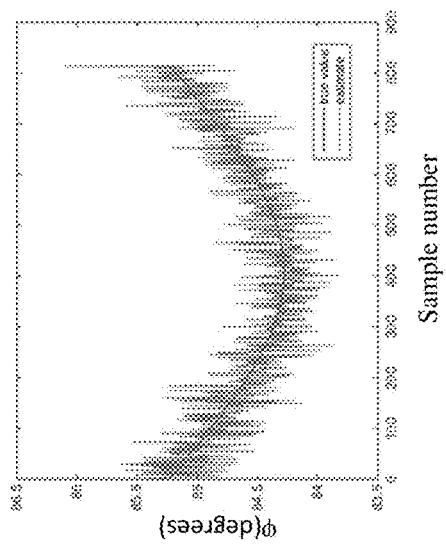
FIG. 6C is a schematic illustration of a graph depicting estimated values and true values of an elevation AoA corresponding to the user trajectory of FIG. 6A, in accordance with some demonstrative embodiments.
Figure 6B:
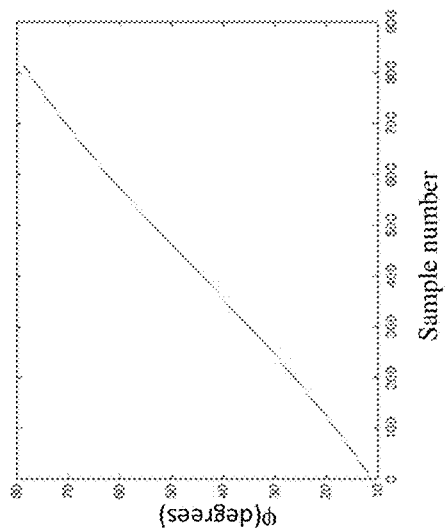
FIG. 6B is a schematic illustration of a graph depicting estimated values and true values of an azimuth Angle of Arrival (AoA) corresponding to the user trajectory of FIG. 6A.
Figure 6A:
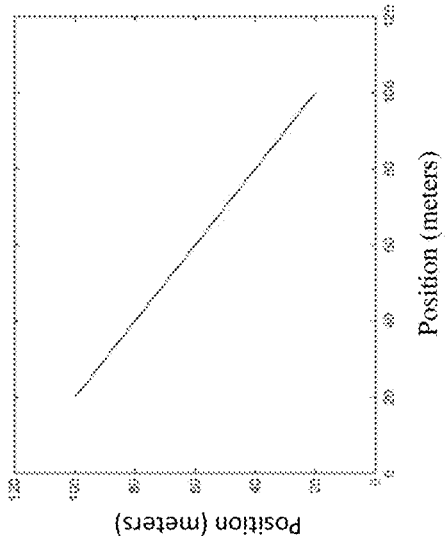
FIG. 6A is a schematic illustration of a graph depicting a user trajectory.

Reference is made to FIG. 6A, which schematically illustrates a graph depicting a user trajectory of a user moving from an initial point (100, 20) to a final point (20, 100) at a speed of 5 kilometer/hour (km/h); to FIG. 6B, which schematically illustrates a graph depicting estimated values and true values of an azimuth AoA, and to FIG. 6C, which schematically illustrates a graph depicting estimated values and true values of an elevation AoA, in accordance with some demonstrative embodiments.

In some demonstrative embodiments, the estimated values and true values of the azimuth AoA may substantially coincide, e.g., as shown in FIG. 6B; and/or estimated values may have a noticeable estimation error from the true values of the elevation AoA, e.g., as shown in FIG. 6C.

In some demonstrative embodiments, a first station may determine the azimuth AoA of signals received at the first station from a second station, which is carried by the user, e.g., moving according to the trajectory of FIG. 6A. In some demonstrative embodiments, a height difference between the first and second may be, for example, 8.5 meters (m).

In some demonstrative embodiments, the first station may detect the user during the SSW, and may track the user every 100 ms.

In some demonstrative embodiments, the speed of the user is assumed to be 5 km/h, e.g., an average pedestrian speed.

In some demonstrative embodiments, the first station may update an azimuth beam steering angle of a beam to the second wireless station, e.g., after every estimation of the azimuth AoA.

In some demonstrative embodiments, the first station may determine the elevation AoA of the signals received at the first station from the second station, which is carried by the user.

In some demonstrative embodiments, the first station may update an elevation beam steering angle of the beam to the second wireless station, e.g., after every estimation of the azimuth AoA.

Figure 7:
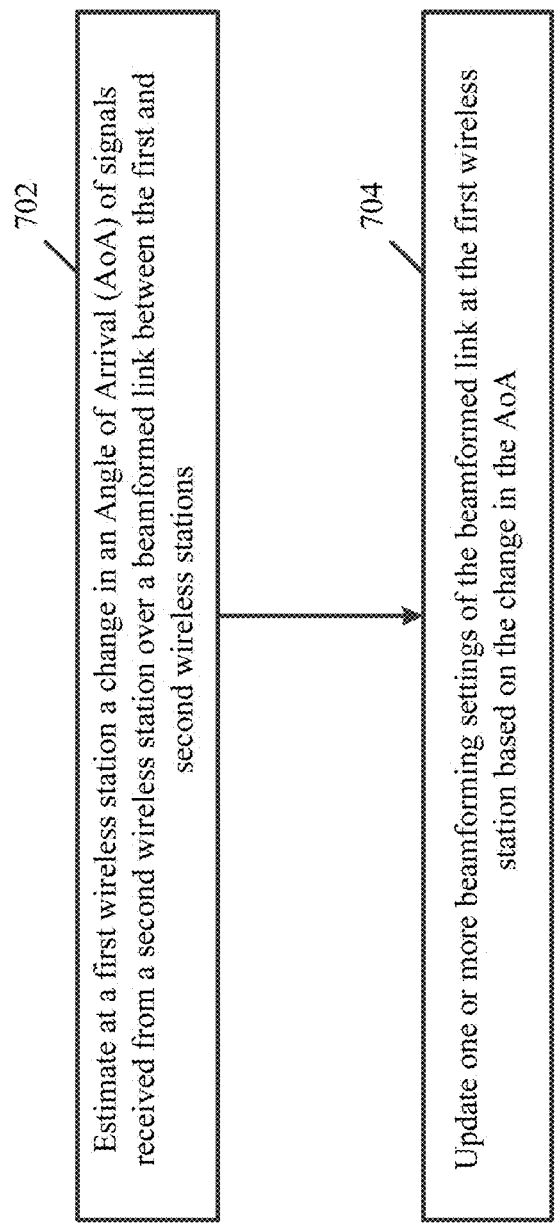
FIG. 7 is a schematic flow-chart illustration of a method of updating one or more beamforming settings of a beamformed link, in accordance with some demonstrative embodiments.

Reference is made to FIG. 7, which schematically illustrates a method of updating one or more beamforming settings of a beamformed link, in accordance with some demonstrative embodiments. For example, one or more of the operations of the method of FIG. 7 may be performed by one or more elements of a system, e.g., system 100 (FIG. 1), for example, one or more wireless devices, e.g., device 102

(FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include estimating at a first wireless station a change in an AoA of signals received from a second wireless station over a beamformed link between the first and second wireless stations. For example, device 102 (FIG. 1) may estimate the AoA of the signals received from device 140 (FIG. 1) over the beamformed link between devices 102 and 140 (FIG. 1), e.g., as described above.

As indicated at block 704, the method may include updating one or more beamforming settings of the beamformed link based on the change in the AoA. For example, device 102 (FIG. 1) may update one or more beamforming settings of the beamformed link, for example, based on the change in the AoA, e.g., as described above.

Figure 8:
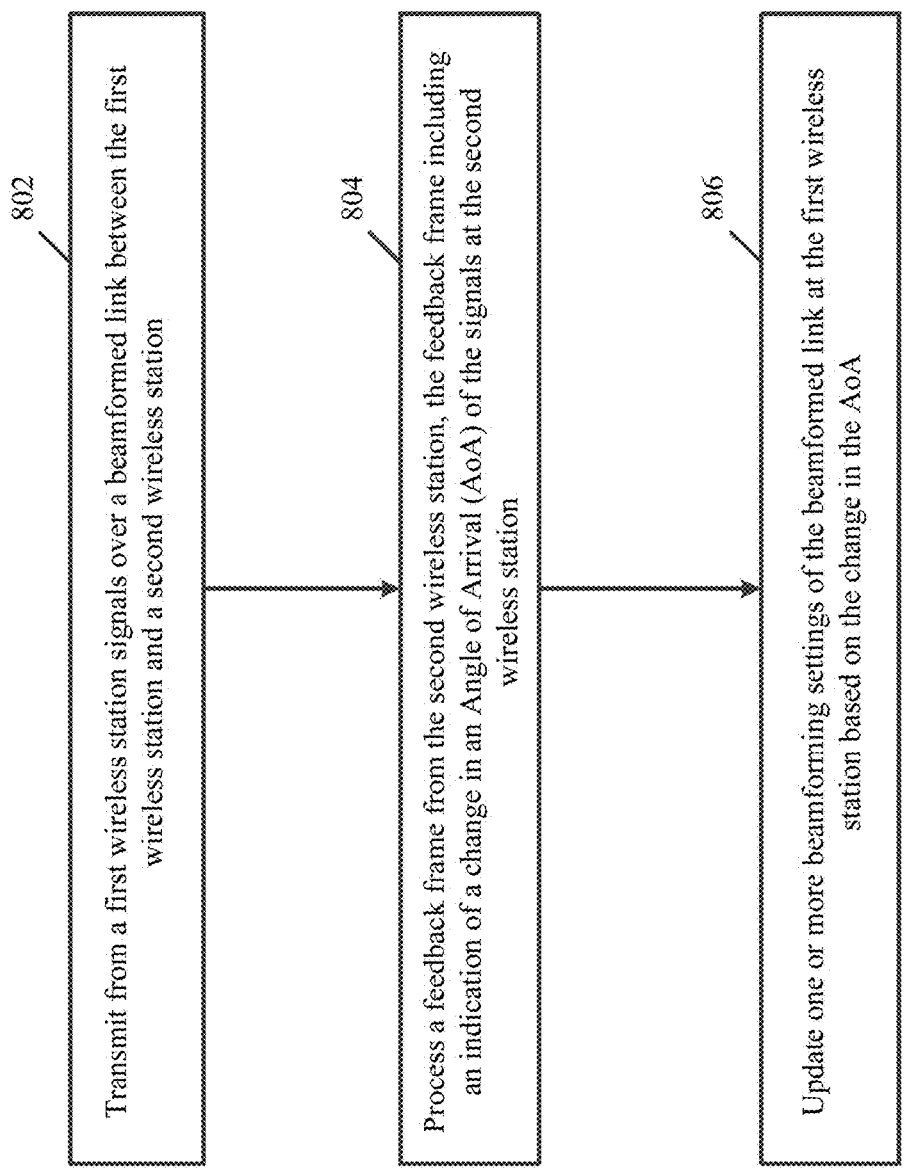
FIG. 8 is a schematic flow-chart illustration of a method of updating one or more beamforming settings of a beamformed link, in accordance with some demonstrative embodiments.

Reference is made to FIG. 8, which schematically illustrates a method of updating one or more beamforming settings of a beamformed link, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 802, the method may include transmitting signals over a beamformed link between a first wireless station and a second wireless station. For example, device 140 (FIG. 1) may transmit signals over the beamformed link between devices 102 and 140 (FIG. 1), e.g., as described above.

As indicated at block 804, the method may include processing a feedback frame from the second wireless station, the feedback frame including an indication of a change in an AoA of the signals at the second wireless station. For example, device 140 (FIG. 1) may process the feedback frame from device 102 (FIG. 1), the feedback frame including the indication of the change in the AoA of the signals at device 102 (FIG. 1), e.g., as described above.

As indicated at block 806, the method may include update one or more beamforming settings of the beamformed link based on the change in the AoA. For example, device 140 (FIG. 1) may update the one or more beamforming settings of the beamformed link at device 140 (FIG. 1), for example, based on the change in the AoA, e.g., as described above.

Figure 9:
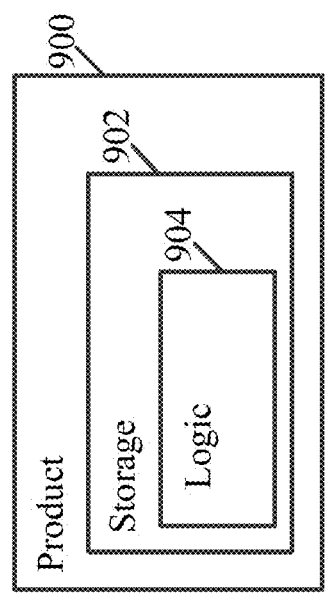
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at f device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities as describe d above with reference to FIGS. 1, 2, 3, 4, 5, 6, 7, and/or 8, and/or one or more operations described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to estimate a change in an Angle of Arrival (AoA) of signals received from a second wireless station over a beamformed link between the first and second wireless stations; and update one or more beamforming settings of the beamformed link based on the change in the AoA.

Example 2 includes the subject matter of Example 1, and optionally, wherein the apparatus is configured to cause the first wireless station to update the beamforming settings based on a comparison between the change in the AoA and a predefined threshold.

Example 3 includes the subject matter of Example 1 or 2, and optionally, wherein the apparatus is configured to cause the first wireless station to increase a receive beamwidth of a receive beam of the beamformed link, based on the change in the AoA.

Example 4 includes the subject matter of Example 3, and optionally, wherein the apparatus is configured to cause the first wireless station to transmit to the second wireless station a feedback frame indicating a broadening factor of the increase of the receive beamwidth.

Example 5 includes the subject matter of any one of Examples 1-4, and optionally, wherein the apparatus is configured to cause the first wireless station to increase a transmit beamwidth of a transmit beam of the beamformed link, based on the change in the AoA.

Example 6 includes the subject matter of any one of Examples 1-5, and optionally, wherein the one or more beamforming settings comprise one or more receive beamforming settings to receive the signals.

Example 7 includes the subject matter of Example 6, and optionally, wherein the receive beamforming settings comprise at least one setting selected from the group consisting of a receive beamwidth of a receive beam to receive the signals, a receive sector to receive the signals, and one or more weight vectors to form the receive beam.

Example 8 includes the subject matter of any one of Examples 1-7, and optionally, wherein the one or more beamforming settings comprise one or more transmit beamforming settings to transmit over the beamformed link.

Example 9 includes the subject matter of Example 8, and optionally, wherein the transmit beamforming settings comprise at least one setting selected from the group consisting of a transmit beamwidth of a transmit beam, a transmit sector to transmit the transmissions, and one or more weight vectors to form the transmit beam.

Example 10 includes the subject matter of any one of Examples 1-9, and optionally, wherein the apparatus is configured to cause the first wireless station to transmit to the second wireless station a feedback frame comprising an indication of the change in the AoA.

Example 11 includes the subject matter of any one of Examples 1-10, and optionally, wherein the apparatus is configured to cause the first wireless station to initiate a sector sweep (SSW) procedure or a beam refinement procedure (BRP) with the second wireless station based on the change in the AoA.

Example 12 includes the subject matter of Example 11, and optionally, wherein the apparatus is configured to cause the first wireless station to transmit to the second wireless station a feedback frame to request to perform the SSW procedure or the BRP.

Example 13 includes the subject matter of any one of Examples 1-12, and optionally, wherein the apparatus is configured to cause the first wireless station to transmit to the second wireless station a feedback frame to request the second wireless station to increase a transmit beamwidth of a transmit beam of the beamformed link.

Example 14 includes the subject matter of any one of Examples 1-13, and optionally, wherein the apparatus is configured to cause the first wireless station to process communication over the beamformed link according to a hybrid beamforming scheme.

Example 15 includes the subject matter of any one of Examples 1-14, and optionally, wherein the beamformed link comprises a beamformed link over a millimeter (mm) Wave (mmWave) frequency band.

Example 16 includes the subject matter of any one of Examples 1-15, and optionally, comprising one or more antennas, a memory and a processor.

Example 17 includes a system of wireless communication comprising a first wireless device, the first wireless device comprising one or more antennas; a memory; a processor; and a controller configured to cause the first wireless device to estimate a change in an Angle of Arrival (AoA) of signals received from a second wireless station over a beamformed link between the first and second wireless stations; and update one or more beamforming settings of the beamformed link based on the change in the AoA.

Example 18 includes the subject matter of Example 17, and optionally, wherein the controller is configured to cause the first wireless station to update the beamforming settings based on a comparison between the change in the AoA and a predefined threshold.

Example 19 includes the subject matter of Example 17 or 18, and optionally, wherein the controller is configured to cause the first wireless station to increase a receive beamwidth of a receive beam of the beamformed link, based on the change in the AoA.

Example 20 includes the subject matter of Example 19, and optionally, wherein the controller is configured to cause the first wireless station to transmit to the second wireless station a feedback frame indicating a broadening factor of the increase of the receive beamwidth.

Example 21 includes the subject matter of any one of Examples 17-20, and optionally, wherein the controller is configured to cause the first wireless station to increase a transmit beamwidth of a transmit beam of the beamformed link, based on the change in the AoA.

Example 22 includes the subject matter of any one of Examples 17-21, and optionally, wherein the one or more beamforming settings comprise one or more receive beamforming settings to receive the signals.

Example 23 includes the subject matter of Example 22, and optionally, wherein the receive beamforming settings comprise at least one setting selected from the group consisting of a receive beamwidth of a receive beam to receive the signals, a receive sector to receive the signals, and one or more weight vectors to form the receive beam.

Example 24 includes the subject matter of any one of Examples 17-23, and optionally, wherein the one or more beamforming settings comprise one or more transmit beamforming settings to transmit over the beamformed link.

Example 25 includes the subject matter of Example 24, and optionally, wherein the transmit beamforming settings comprise at least one setting selected from the group consisting of a transmit beamwidth of a transmit beam, a transmit sector to transmit the transmissions, and one or more weight vectors to form the transmit beam.

Example 26 includes the subject matter of any one of Examples 17-25, and optionally, wherein the controller is configured to cause the first wireless station to transmit to the second wireless station a feedback frame comprising an indication of the change in the AoA.

Example 27 includes the subject matter of any one of Examples 17-26, and optionally, wherein the controller is configured to cause the first wireless station to initiate a sector sweep (SSW) procedure or a beam refinement procedure (BRP) with the second wireless station based on the change in the AoA.

Example 28 includes the subject matter of Example 27, and optionally, wherein the controller is configured to cause the first wireless station to transmit to the second wireless station a feedback frame to request to perform the SSW procedure or the BRP.

Example 29 includes the subject matter of any one of Examples 17-28, and optionally, wherein the controller is configured to cause the first wireless station to transmit to the second wireless station a feedback frame to request the second wireless station to increase a transmit beamwidth of a transmit beam of the beamformed link.

Example 30 includes the subject matter of any one of Examples 17-29, and optionally, wherein the controller is configured to cause the first wireless station to process communication over the beamformed link according to a hybrid beamforming scheme.

Example 31 includes the subject matter of any one of Examples 17-30, and optionally, wherein the beamformed link comprises a beamformed link over a millimeter (mm) Wave (mmWave) frequency band.

Example 32 includes a method to be performed at a first wireless station, the method comprising estimating a change in an Angle of Arrival (AoA) of signals received from a second wireless station over a beamformed link between the first and second wireless stations; and updating one or more beamforming settings of the beamformed link based on the change in the AoA.

Example 33 includes the subject matter of Example 32, and optionally, comprising updating the beamforming settings based on a comparison between the change in the AoA and a predefined threshold.

Example 34 includes the subject matter of Example 32 or 33, and optionally, comprising increasing a receive beamwidth of a receive beam of the beamformed link, based on the change in the AoA.

Example 35 includes the subject matter of Example 34, and optionally, comprising transmitting to the second wireless station a feedback frame indicating a broadening factor of the increase of the receive beamwidth.

Example 36 includes the subject matter of any one of Examples 32-35, and optionally, comprising increasing a transmit beamwidth of a transmit beam of the beamformed link, based on the change in the AoA.

Example 37 includes the subject matter of any one of Examples 32-36, and optionally, wherein the one or more beamforming settings comprise one or more receive beamforming settings to receive the signals.

Example 38 includes the subject matter of Example 37, and optionally, wherein the receive beamforming settings comprise at least one setting selected from the group consisting of a receive beamwidth of a receive beam to receive the signals, a receive sector to receive the signals, and one or more weight vectors to form the receive beam.

Example 39 includes the subject matter of any one of Examples 32-38, and optionally, wherein the one or more beamforming settings comprise one or more transmit beamforming settings to transmit over the beamformed link.

Example 40 includes the subject matter of Example 39, and optionally, wherein the transmit beamforming settings comprise at least one setting selected from the group consisting of a transmit beamwidth of a transmit beam, a transmit sector to transmit the transmissions, and one or more weight vectors to form the transmit beam.

Example 41 includes the subject matter of any one of Examples 32-40, and optionally, comprising transmitting to the second wireless station a feedback frame comprising an indication of the change in the AoA.

Example 42 includes the subject matter of any one of Examples 32-41, and optionally, comprising initiating a sector sweep (SSW) procedure or a beam refinement procedure (BRP) with the second wireless station based on the change in the AoA.

Example 43 includes the subject matter of Example 42, and optionally, comprising transmitting to the second wireless station a feedback frame to request to perform the SSW procedure or the BRP.

Example 44 includes the subject matter of any one of Examples 32-43, and optionally, comprising transmitting to the second wireless station a feedback frame to request the second wireless station to increase a transmit beamwidth of a transmit beam of the beamformed link.

Example 45 includes the subject matter of any one of Examples 32-44, and optionally, comprising processing communication over the beamformed link according to a hybrid beamforming scheme.

Example 46 includes the subject matter of any one of Examples 32-45, and optionally, wherein the beamformed link comprises a beamformed link over a millimeter (mm) Wave (mmWave) frequency band.

Example 47 includes a product comprising one or more tangible computer-readable non-transitory storage media comprising computer-executable instructions operable to, when executed by at least one computer processor, enable the at least one computer processor to implement operations at a first wireless station, the operations comprising estimating a change in an Angle of Arrival (AoA) of signals received from a second wireless station over a beamformed link between the first and second wireless stations; and updating one or more beamforming settings of the beamformed link based on the change in the AoA.

Example 48 includes the subject matter of Example 47, and optionally, wherein the operations comprise updating the beamforming settings based on a comparison between the change in the AoA and a predefined threshold.

Example 49 includes the subject matter of Example 47 or 48, and optionally, wherein the operations comprise increasing a receive beamwidth of a receive beam of the beamformed link, based on the change in the AoA.

Example 50 includes the subject matter of Example 49, and optionally, wherein the operations comprise transmitting to the second wireless station a feedback frame indicating a broadening factor of the increase of the receive beamwidth.

Example 51 includes the subject matter of any one of Examples 47-50, and optionally, wherein the operations comprise increasing a transmit beamwidth of a transmit beam of the beamformed link, based on the change in the AoA.

Example 52 includes the subject matter of any one of Examples 47-51, and optionally, wherein the one or more beamforming settings comprise one or more receive beamforming settings to receive the signals.

Example 53 includes the subject matter of Example 52, and optionally, wherein the receive beamforming settings comprise at least one setting selected from the group consisting of a receive beamwidth of a receive beam to receive the signals, a receive sector to receive the signals, and one or more weight vectors to form the receive beam.

Example 54 includes the subject matter of any one of Examples 47-53, and optionally, wherein the one or more beamforming settings comprise one or more transmit beamforming settings to transmit over the beamformed link.

Example 55 includes the subject matter of Example 54, and optionally, wherein the transmit beamforming settings comprise at least one setting selected from the group consisting of a transmit beamwidth of a transmit beam, a transmit sector to transmit the transmissions, and one or more weight vectors to form the transmit beam.

Example 56 includes the subject matter of any one of Examples 47-55, and optionally, wherein the operations comprise transmitting to the second wireless station a feedback frame comprising an indication of the change in the AoA.

Example 57 includes the subject matter of any one of Examples 47-56, and optionally, wherein the operations comprise initiating a sector sweep (SSW) procedure or a beam refinement procedure (BRP) with the second wireless station based on the change in the AoA.

Example 58 includes the subject matter of Example 57, and optionally, wherein the operations comprise transmitting to the second wireless station a feedback frame to request to perform the SSW procedure or the BRP.

Example 59 includes the subject matter of any one of Examples 47-58, and optionally, wherein the operations comprise transmitting to the second wireless station a feedback frame to request the second wireless station to increase a transmit beamwidth of a transmit beam of the beamformed link.

Example 60 includes the subject matter of any one of Examples 47-59, and optionally, wherein the operations comprise processing communication over the beamformed link according to a hybrid beamforming scheme.

Example 61 includes the subject matter of any one of Examples 47-60, and optionally, wherein the beamformed link comprises a beamformed link over a millimeter (mm) Wave (mmWave) frequency band.

Example 62 includes an apparatus of wireless communication by a first wireless station, the apparatus comprising means for estimating a change in an Angle of Arrival (AoA) of signals received from a second wireless station over a beamformed link between the first and second wireless stations; and means for updating one or more beamforming settings of the beamformed link based on the change in the AoA.

Example 63 includes the subject matter of Example 62, and optionally, comprising means for updating the beamforming settings based on a comparison between the change in the AoA and a predefined threshold.

Example 64 includes the subject matter of Example 62 or 63, and optionally, comprising means for increasing a receive beamwidth of a receive beam of the beamformed link, based on the change in the AoA.

Example 65 includes the subject matter of Example 64, and optionally, comprising means for transmitting to the second wireless station a feedback frame indicating a broadening factor of the increase of the receive beamwidth.

Example 66 includes the subject matter of any one of Examples 62-65, and optionally, comprising means for increasing a transmit beamwidth of a transmit beam of the beamformed link, based on the change in the AoA.

Example 67 includes the subject matter of any one of Examples 62-66, and optionally, wherein the one or more beamforming settings comprise one or more receive beamforming settings to receive the signals.

Example 68 includes the subject matter of Example 67, and optionally, wherein the receive beamforming settings comprise at least one setting selected from the group consisting of a receive beamwidth of a receive beam to receive the signals, a receive sector to receive the signals, and one or more weight vectors to form the receive beam.

Example 69 includes the subject matter of any one of Examples 62-68, and optionally, wherein the one or more beamforming settings comprise one or more transmit beamforming settings to transmit over the beamformed link.

Example 70 includes the subject matter of Example 69, and optionally, wherein the transmit beamforming settings comprise at least one setting selected from the group consisting of a transmit beamwidth of a transmit beam, a transmit sector to transmit the transmissions, and one or more weight vectors to form the transmit beam.

Example 71 includes the subject matter of any one of Examples 62-70, and optionally, comprising means for transmitting to the second wireless station a feedback frame comprising an indication of the change in the AoA.

Example 72 includes the subject matter of any one of Examples 62-71, and optionally, comprising means for initiating a sector sweep (SSW) procedure or a beam refinement procedure (BRP) with the second wireless station based on the change in the AoA.

Example 73 includes the subject matter of Example 72, and optionally, comprising means for transmitting to the second wireless station a feedback frame to request to perform the SSW procedure or the BRP.

Example 74 includes the subject matter of any one of Examples 62-73, and optionally, comprising means for transmitting to the second wireless station a feedback frame to request the second wireless station to increase a transmit beamwidth of a transmit beam of the beamformed link.

Example 75 includes the subject matter of any one of Examples 62-74, and optionally, comprising means for processing communication over the beamformed link according to a hybrid beamforming scheme.

Example 76 includes the subject matter of any one of Examples 62-75, and optionally, wherein the beamformed link comprises a beamformed link over a millimeter (mm) Wave (mmWave) frequency band.

Example 77 includes an apparatus comprising circuitry and logic configured to cause a first wireless station to transmit signals over a beamformed link between the first wireless station and a second wireless station; process a feedback frame from the second wireless station, the feedback frame comprising an indication of a change in an Angle of Arrival (AoA) of the signals at the second wireless station; and update one or more beamforming settings of the beamformed link based on the change in the AoA.

Example 78 includes the subject matter of Example 77, and optionally, wherein the apparatus is configured to cause the first wireless station to increase a transmit beamwidth of a transmit beam to transmit over the beamformed link, based on the change in the AoA.

Example 79 includes the subject matter of Example 77 or 78, and optionally, wherein the apparatus is configured to cause the first wireless station to increase a receive beamwidth of a receive beam of the beamformed link, based on the change in the AoA.

Example 80 includes the subject matter of any one of Examples 77-79, and optionally, wherein the apparatus is configured to cause the first wireless station to initiate a sector sweep (SSW) procedure or a beam refinement procedure (BRP) with the second wireless station based on the change in the AoA.

Example 81 includes the subject matter of any one of Examples 77-80, and optionally, wherein the apparatus is configured to cause the first wireless station to process communication over the beamformed link according to a hybrid beamforming scheme.

Example 82 includes the subject matter of any one of Examples 77-81, and optionally, wherein the beamformed link comprises a beamformed link over a millimeter (mm) Wave (mmWave) frequency band.

Example 83 includes the subject matter of any one of Examples 77-82, and optionally, comprising one or more antennas, a memory and a processor.

Example 84 includes a system of wireless communication comprising a first wireless station, the first wireless station comprising one or more antennas; a memory; a processor; and a controller configured to cause the first wireless station to transmit signals over a beamformed link between the first wireless station and a second wireless station; process a feedback frame from the second wireless station, the feedback frame comprising an indication of a change in an Angle of Arrival (AoA) of the signals at the second wireless station; and update one or more beamforming settings of the beamformed link based on the change in the AoA.

Example 85 includes the subject matter of Example 84, and optionally, wherein the controller is configured to cause the first wireless station to increase a transmit beamwidth of a transmit beam to transmit over the beamformed link, based on the change in the AoA.

Example 86 includes the subject matter of Example 84 or 85, and optionally, wherein the controller is configured to cause the first wireless station to increase a receive beamwidth of a receive beam of the beamformed link, based on the change in the AoA.

Example 87 includes the subject matter of any one of Examples 84-86, and optionally, wherein the controller is configured to cause the first wireless station to initiate a sector sweep (SSW) procedure or a beam refinement procedure (BRP) with the second wireless station based on the change in the AoA.

Example 88 includes the subject matter of any one of Examples 84-87, and optionally, wherein the controller is configured to cause the first wireless station to process communication over the beamformed link according to a hybrid beamforming scheme.

Example 89 includes the subject matter of any one of Examples 84-88, and optionally, wherein the beamformed link comprises a beamformed link over a millimeter (mm) Wave (mmWave) frequency band.

Example 90 includes a method to be performed at a first wireless station, the method comprising transmitting signals over a beamformed link between the first wireless station and a second wireless station; processing a feedback frame from the second wireless station, the feedback frame comprising an indication of a change in an Angle of Arrival (AoA) of the signals at the second wireless station; and updating one or more beamforming settings of the beamformed link based on the change in the AoA.

Example 91 includes the subject matter of Example 90, and optionally, comprising increasing a transmit beamwidth of a transmit beam to transmit over the beamformed link, based on the change in the AoA.

Example 92 includes the subject matter of Example 90 or 91, and optionally, comprising increasing a receive beamwidth of a receive beam of the beamformed link, based on the change in the AoA.

Example 93 includes the subject matter of any one of Examples 90-92, and optionally, comprising initiating a sector sweep (SSW) procedure or a beam refinement procedure (BRP) with the second wireless station based on the change in the AoA.

Example 94 includes the subject matter of any one of Examples 90-93, and optionally, comprising processing communication over the beamformed link according to a hybrid beamforming scheme.

Example 95 includes the subject matter of any one of Examples 90-94, and optionally, wherein the beamformed link comprises a beamformed link over a millimeter (mm) Wave (mmWave) frequency band.

Example 96 includes a product comprising one or more tangible computer-readable non-transitory storage media comprising computer-executable instructions operable to, when executed by at least one computer processor, enable the at least one computer processor to implement operations at a first wireless station, the operations comprising transmitting signals over a beamformed link between the first wireless station and a second wireless station; processing a feedback frame from the second wireless station, the feedback frame comprising an indication of a change in an Angle of Arrival (AoA) of the signals at the second wireless station; and updating one or more beamforming settings of the beamformed link based on the change in the AoA.

Example 97 includes the subject matter of Example 96, and optionally, wherein the operations comprise increasing a transmit beamwidth of a transmit beam to transmit over the beamformed link, based on the change in the AoA.

Example 98 includes the subject matter of Example 96 or 97, and optionally, wherein the operations comprise increasing a receive beamwidth of a receive beam of the beamformed link, based on the change in the AoA.

Example 99 includes the subject matter of any one of Examples 96-98, and optionally, wherein the operations comprise initiating a sector sweep (SSW) procedure or a beam refinement procedure (BRP) with the second wireless station based on the change in the AoA.

Example 100 includes the subject matter of any one of Examples 96-99, and optionally, wherein the operations comprise processing communication over the beamformed link according to a hybrid beamforming scheme.

Example 101 includes the subject matter of any one of Examples 96-100, and optionally, wherein the beamformed link comprises a beamformed link over a millimeter (mm) Wave (mmWave) frequency band.

Example 102 includes an apparatus of wireless communication by a first wireless station, the apparatus comprising means for transmitting signals over a beamformed link between the first wireless station and a second wireless station; means for processing a feedback frame from the second wireless station, the feedback frame comprising an indication of a change in an Angle of Arrival (AoA) of the signals at the second wireless station; and means for updating one or more beamforming settings of the beamformed link based on the change in the AoA.

Example 103 includes the subject matter of Example 102, and optionally, comprising means for increasing a transmit beamwidth of a transmit beam to transmit over the beamformed link, based on the change in the AoA.

Example 104 includes the subject matter of Example 102 or 103, and optionally, comprising means for increasing a receive beamwidth of a receive beam of the beamformed link, based on the change in the AoA.

Example 105 includes the subject matter of any one of Examples 102-104, and optionally, comprising means for initiating a sector sweep (SSW) procedure or a beam refinement procedure (BRP) with the second wireless station based on the change in the AoA.

Example 106 includes the subject matter of any one of Examples 102-105, and optionally, comprising means for processing communication over the beamformed link according to a hybrid beamforming scheme.

Example 107 includes the subject matter of any one of Examples 102-106, and optionally, wherein the beamformed link comprises a beamformed link over a millimeter (mm) Wave (mmWave) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first wireless station to:
    estimate a change in an Angle of Arrival (AoA) of signals received from a second wireless station over a beamformed link between said first and second wireless stations; and
    update one or more beamforming settings of said beamformed link based on the change in the AoA, the apparatus configured to cause the first wireless station to initiate a sector sweep (SSW) procedure or a beam refinement procedure (BRP) with said second wireless station based on the change in the AoA, the apparatus configured to cause the first wireless station to transmit to said second wireless station a feedback frame to request to perform said SSW procedure or said BRP.

2. The apparatus of claim 1 configured to cause the first wireless station to update the beamforming settings based on a comparison between the change in the AoA and a predefined threshold.

3. The apparatus of claim 1 configured to cause the first wireless station to increase a receive beamwidth of a receive beam of said beamformed link, based on the change in the AoA.

4. The apparatus of claim 3 configured to cause the first wireless station to transmit to said second wireless station an indication of a broadening factor of the increase of the receive beamwidth.

5. The apparatus of claim 1 configured to cause the first wireless station to increase a transmit beamwidth of a transmit beam of said beamformed link, based on the change in the AoA.

6. The apparatus of claim 1, wherein said one or more beamforming settings comprise one or more receive beamforming settings to receive said signals.

7. The apparatus of claim 6, wherein said receive beamforming settings comprise at least one setting selected from the group consisting of a receive beamwidth of a receive beam to receive said signals, a receive sector to receive said signals, and one or more weight vectors to form said receive beam.

8. The apparatus of claim 1, wherein said one or more beamforming settings comprise one or more transmit beamforming settings to transmit over said beamformed link.

9. The apparatus of claim 8, wherein said transmit beamforming settings comprise at least one setting selected from the group consisting of a transmit beamwidth of a transmit beam, a transmit sector to transmit said transmissions, and one or more weight vectors to form said transmit beam.

10. The apparatus of claim 1 configured to cause the first wireless station to transmit to said second wireless station an indication of the change in the AoA.

11. The apparatus of claim 1 configured to cause the first wireless station to transmit to said second wireless station a request to increase a transmit beamwidth of a transmit beam of said beamformed link.

12. The apparatus of claim 1 configured to cause the first wireless station to process communication over the beamformed link according to a hybrid beamforming scheme.

13. The apparatus of claim 1, wherein said beamformed link comprises a beamformed link over a millimeter (mm) Wave (mmWave) frequency band.

14. The apparatus of claim 1 comprising one or more antennas, a memory and a processor.

15. A product comprising one or more tangible computer-readable non-transitory storage media comprising computer-executable instructions operable to, when executed by at least one processor, enable the at least one processor to cause a first wireless station to:
    estimate a change in an Angle of Arrival (AoA) of signals received from a second wireless station over a beamformed link between said first and second wireless stations; and
    update one or more beamforming settings of said beamformed link based on the change in the AoA, the instructions, when executed, to cause the first wireless station to initiate a sector sweep (SSW) procedure or a beam refinement procedure (BRP) with said second wireless station based on the change in the AoA, the instructions, when executed, to cause the first wireless station to transmit to said second wireless station a feedback frame to request to perform said SSW procedure or said BRP.

16. The product of claim 15, wherein said one or more beamforming settings comprise one or more receive beamforming settings to receive said signals.

17. The product of claim 15, wherein the instructions, when executed, cause the first wireless station to transmit to said second wireless station an indication of the change in the AoA.

18. The product of claim 15, wherein the instructions, when executed, cause the first wireless station to update the beamforming settings based on a comparison between the change in the AoA and a predefined threshold.

19. An apparatus comprising circuitry and logic configured to cause a first wireless station to:
    transmit signals over a beamformed link between said first wireless station and a second wireless station;
    process a feedback frame from the second wireless station, the feedback frame comprising an indication of a change in an Angle of Arrival (AoA) of said signals at said second wireless station; and
    update one or more beamforming settings of said beamformed link based on the change in the AoA.

20. The apparatus of claim 19 configured to cause the first wireless station to increase a transmit beamwidth of a transmit beam to transmit over said beamformed link, based on the change in the AoA.

21. The apparatus of claim 19 configured to cause the first wireless station to increase a receive beamwidth of a receive beam of said beamformed link, based on the change in the AoA.

22. The apparatus of claim 19 configured to cause the first wireless station to initiate a sector sweep (SSW) procedure or a beam refinement procedure (BRP) with said second wireless station based on the change in the AoA.

23. The apparatus of claim 19 comprising one or more antennas, a memory and a processor.

24. A product comprising one or more tangible computer-readable non-transitory storage media comprising computer-executable instructions operable to, when executed by at least one processor, enable the at least one processor to cause a first wireless station to:
   transmit signals over a beamformed link between said first wireless station and a second wireless station;
   process a feedback frame from the second wireless station, the feedback frame comprising an indication of a change in an Angle of Arrival (AoA) of said signals at said second wireless station; and
   update one or more beamforming settings of said beamformed link based on the change in the AoA.

25. The product of claim 24, wherein the instructions, when execute, cause the first wireless station to initiate a sector sweep (SSW) procedure or a beam refinement procedure (BRP) with said second wireless station based on the change in the AoA.

* * * * *

UNITED STATES PATENT AND TRADEMARK OFFICE
CERTIFICATE OF CORRECTION

PATENT NO. : 9,866,293 B1
APPLICATION NO. : 15/199422
DATED : January 9, 2018
INVENTOR(S) : Claudio Da Silva et al.

Page 1 of 1

It is certified that error appears in the above-identified patent and that said Letters Patent is hereby corrected as shown below:

In the Claims

In Column 35, Line 25, in Claim 25, delete "execute," and insert -- executed, --, therefor.

Signed and Sealed this
Third Day of July, 2018

Andrei Iancu
*Director of the United States Patent and Trademark Office*